UNITED STATES PATENT OFFICE.

ARTHUR S. HOYT, OF BROOKLYN, NEW YORK.

ADHESIVE.

SPECIFICATION forming part of Letters Patent No. 709,544, dated September 23, 1902.

Application filed June 5, 1901. Serial No. 63,228. (No specimens.)

*To all whom it may concern:*

Be it known that I, ARTHUR S. HOYT, a citizen of the United States, residing in the borough of Brooklyn, in the city of New York, in the county of Kings and State of New York, have invented a new Adhesive, of which the following is a specification.

My invention relates to a new article of manufacture which is soluble and well adapted for use as an adhesive when dissolved, the result of a novel process for the utilization of certain by-products evolved in the manufacture of starch from wheat-flour.

In an application for Letters Patent of the United States for the process referred to filed by me on the 4th day of May, 1901, Serial No. 58,803, I have described and claimed this process, and it is necessary that I should to a certain extent repeat this description in this specification.

In the manufacture of starch from wheat-flour by mechanical processes as now generally practiced the flour is first kneaded into a stiff paste with water. After permitting this to rest for a short time—say one or two hours—it is washed through a fine sieve, whereby the starch is freed from the gluten and the greater part of the gluten is retained in a sticky elastic mass on the sieve. The washing is continued so long as the water remains milky. A further separation of the starchy mass held in suspension in the water then takes place. This may be accomplished by centrifugal drums or by gravity. The starch of commerce, and which it is the aim of the starch manufacturer to secure, is contained in the particles having the greater density and which are thus separated out from the starch liquid originally produced. My invention has to do with the supernatant liquid remaining after the commercial starch has been thus removed. In most starch-factories this liquid is allowed to go to waste. I have discovered that there are suspended in this liquid two kinds of materials—namely, starchy substances and certain albuminous compounds, the latter having about the specific gravity of water. It is out of this residue that I make my new product.

I first remove the bulk of the water. In so doing I draw the liquid referred to into large settling-tanks and permit it to remain there for several hours until the upper portion of the liquid becomes measurably clear and is seen to contain few suspended particles. These I cause to be precipitated to the bottom of the tank by adding a small amount of alum, in about the proportion of one pound of alum to one hundred gallons of the liquid, which alum I afterward neutralize with an alkali, preferably lime, in a small quantity. The addition of alum is not necessary unless a quick precipitation is desired, because if the liquid is permitted to settle longer the precipitation will be sufficient to clear the bulk of it. Such precipitation I decant or otherwise remove, the cleared liquid leaving a concentrated liquid at the bottom, which contains the material I desire to secure. From the bottom of the settling-tank I draw the concentrated liquid into a digester or cooker and subject it to the action of heat at 212° Fahrenheit or more for a suitable length of time, usually from three to five minutes, until the mass is converted into an opalescent transparent or translucent jelly. This cooked jelly must be dried and powdered. For this purpose I cause it to be discharged from the cooker in a thin sheet and to impinge upon a heated roller. The heat of the roller and the thinness of the sheet soon cause the moisture to disappear, and the jelly clings to the roller as the latter revolves until it reaches a point where a knife or other suitable means cleans it therefrom. It is then ground or rubbed to powder and is ready for use. The principal use to which it is put is in the manufacture of paste. It forms a peculiarly light, sticky, and adhesive paste, and on account of its low specific gravity it is not separated out when mixed with water, like pastes in which flour and gluten are ingredients.

Having described my invention, what I claim as new is—

1. A new adhesive, containing the solid matter from gluten-water of wheat-starch manufacture concentrated, cooked and reduced to dryness, the same consisting of a mixture of converted starch and albumen forming a soluble powder.

2. A new adhesive containing the solid matter from gluten-water of wheat-starch manufacture, concentrated, cooked and reduced to dryness, the same consisting of a mixture of converted starch and albumen forming a slightly-colored powder soluble in cold water.

Witness my hand this 4th day of June, 1901, in the presence of two subscribing witnesses.

ARTHUR S. HOYT.

Witnesses:
 HERMAN MEYER,
 MABEL K. WHITMAN.